(12) United States Patent
Vainer et al.

(10) Patent No.: US 8,196,118 B2
(45) Date of Patent: Jun. 5, 2012

(54) EVENT SET RECORDING

(75) Inventors: Moshe Vainer, Redmond, WA (US); S Neeraja Reddy, Hyderabad (IN); Shiva Shankar Thangadurai, Hyderabad (IN); Dmitri Klementiev, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 1095 days.

(21) Appl. No.: 12/056,301

(22) Filed: Mar. 27, 2008

(65) Prior Publication Data
US 2009/0249300 A1    Oct. 1, 2009

(51) Int. Cl.
G06F 9/44 (2006.01)
G06F 9/45 (2006.01)
G06F 3/00 (2006.01)
G06F 15/173 (2006.01)

(52) U.S. Cl. ........ 717/130; 717/124; 717/129; 717/158; 715/704; 709/224

(58) Field of Classification Search ......................... None
See application file for complete search history.

(56) References Cited

U.S. PATENT DOCUMENTS

| | | | |
|---|---|---|---|
| 5,781,720 A * | 7/1998 | Parker et al. ............. | 714/38.11 |
| 6,078,327 A | 6/2000 | Liman et al. | |
| 6,266,681 B1 | 7/2001 | Guthrie | |
| 6,408,403 B1 | 6/2002 | Rodrigues et al. | |
| 6,772,165 B2 | 8/2004 | O'Carroll | |
| 6,826,443 B2 | 11/2004 | Makinen | |
| 6,857,124 B1 | 2/2005 | Doyle | |
| 6,868,414 B2 | 3/2005 | Khanna et al. | |
| 7,231,606 B2 | 6/2007 | Miller et al. | |
| 7,243,090 B2 | 7/2007 | Kinzhalin et al. | |
| 7,580,970 B2 | 8/2009 | Bank et al. | |
| 7,653,721 B1 * | 1/2010 | Romanov et al. ............. | 709/224 |
| 7,698,392 B2 | 4/2010 | Zapata et al. | |
| 2002/0083188 A1 | 6/2002 | Hericy et al. | |
| 2002/0188613 A1 | 12/2002 | Chakraborty et al. | |
| 2003/0043192 A1 * | 3/2003 | Bouleau ......................... | 345/762 |
| 2004/0098707 A1 * | 5/2004 | Tang et al. .................... | 717/130 |
| 2004/0225965 A1 | 11/2004 | Garside | |
| 2005/0022115 A1 * | 1/2005 | Baumgartner et al. ....... | 715/513 |
| 2005/0246153 A1 * | 11/2005 | Genkin et al. .................. | 703/22 |
| 2005/0278728 A1 * | 12/2005 | Klementiev .................. | 719/328 |
| 2006/0064481 A1 | 3/2006 | Baron et al. | |
| 2006/0064486 A1 | 3/2006 | Baron et al. | |
| 2006/0095895 A1 * | 5/2006 | K. ................................ | 717/130 |
| 2006/0101392 A1 | 5/2006 | Isaza | |
| 2006/0184410 A1 * | 8/2006 | Ramamurthy et al. .......... | 705/8 |

(Continued)

OTHER PUBLICATIONS

Sampath et al., "Composing a Framework to Automate Testing of Operational Web-Based Software", 2004, pp. 1-10.*

(Continued)

*Primary Examiner* — Isaac Tecklu
(74) *Attorney, Agent, or Firm* — Microsoft Corporation (57) ABSTRACT

Recording of functional steps resulting from actions in an application is desirable for performing functional testing or user interface automation of an application. However, certain events that may result from actions occurring in an application are often difficult to record, which may lead to playback failure. Further, a user's intent when performing an action is difficult to determine. In order to obtain effective playback, a reliable and efficient recording of an application's functional steps needs to occur. Injecting wrapper functions into an application and monitoring an event generator's state before and after an action has occurred may yield more reliable and effective results.

20 Claims, 9 Drawing Sheets

U.S. PATENT DOCUMENTS

| | | | |
|---|---|---|---|
| 2006/0222160 A1 | 10/2006 | Bank et al. | |
| 2006/0276997 A1 | 12/2006 | Drees | |
| 2007/0011650 A1 | 1/2007 | Hage et al. | |
| 2007/0061625 A1 | 3/2007 | Acosta et al. | |
| 2007/0074169 A1 | 3/2007 | Chess et al. | |
| 2007/0088668 A1* | 4/2007 | Larab et al. | 707/1 |
| 2007/0130293 A1 | 6/2007 | Dong et al. | |
| 2007/0150556 A1 | 6/2007 | Fukuda et al. | |
| 2007/0174300 A1 | 7/2007 | Kim | |
| 2007/0174419 A1 | 7/2007 | O'Connell et al. | |
| 2007/0192181 A1 | 8/2007 | Asdourian | |
| 2007/0214239 A1 | 9/2007 | Mechkov et al. | |
| 2007/0240118 A1 | 10/2007 | Keren | |
| 2007/0294619 A1* | 12/2007 | Krishnaswamy et al. | 715/704 |
| 2008/0010537 A1 | 1/2008 | Hayutin et al. | |
| 2008/0092057 A1 | 4/2008 | Monson et al. | |
| 2008/0301816 A1* | 12/2008 | Ting et al. | 726/26 |
| 2009/0089404 A1* | 4/2009 | Guo | 709/219 |
| 2010/0125651 A1 | 5/2010 | Zapata et al. | |
| 2010/0251217 A1* | 9/2010 | Miller | 717/126 |
| 2011/0145402 A1* | 6/2011 | Thangadurai et al. | 709/224 |

OTHER PUBLICATIONS

Rational Software, "IBM Rational Functional Tester", pp. 1-4.

Levy, et al., "Advancing Toward Test Automation through Effective Manual Testing", Dated: May 2005, pp. 1-12.

U.S. Appl. No. 12/055,325, filed Mar. 26, 2008, Shankar et al.

U.S. Appl. No. 12/247,022, filed Oct. 7, 2008, Srivastava et al.

Hadlock Kris, "How to Handle AJAX Responses", Feb. 10, 2006, pp. 1-2.

"How to Use UI Automation Verify (UIA Verify)"; http://www.google.com.in/url?sa=t&ct=res&cd=7&url=http%3A%2F%2Fwww.codeplex.com%2FProject%2FDownload%2FFileDownload.aspx%3FProjectName%3DUIAutomationVerify%26DownloadID%3D29576&ei=WmQhSPr_B4v2wwGXzdnPAw&usg=AFQjCNE-Srz0Yvv3IRaEoh0YFhPCELD14w&sig2=FQzOMkaE7cgKEU2cKNg1Xg.

"Inventions on Tree Navigators Used in Graphical User Interface"; http://papers.ssrn.com/sol3/papers.cfm?abstract_id=949244#PaperDownload.

McCaffrey James, "AJAX Test Automation", http://msdm.microsoft.com/msdnmag/issues/07/02/TestRun/default.aspx.

McLaughlin Brett, "Mastering AJAX, Part 3: Advanced requests and responses in Ajax", Feb. 14, 2006, pp. 1-14.

Raghavan, "AJAX testing using QEngine", Oct. 15, 2007, pp. 1-4.

"UI Automation and Microsoft Active Accessibility", Retrieved at http://msdn.microsoft.com/en-us/library/ms788733.aspx May 7, 2008, p. 1.

"User Interface Automation (UIA)—Working Draft"; http://download.microsoft.com/download/5/e/1/5e168e97-91dd-4ca3-ac7e-2131aec8cd1b/Overview_UIA.doc.

Xiong et al., "Testing Ajax Applications with Selenium", Sep. 25, 2006, pp. 1-5.

Notice of Allowance from related U.S. Appl. No. 12/055,325 dated Oct. 29, 2010.

* cited by examiner

EVENT SET RECORDING

BACKGROUND

In a computing environment, one may wish to automate functional steps of an application, for example, for functional testing or user interaction automation in an application. As an example, in a web-based application, one may wish to test results of changes to a web page by recreating typical user interactions on that page after the changes have been made. In this example, it may be desirable to record events that resulting from actions upon the web page during the user interaction. Recording the events yields an ability to playback the user actions on a web page during a functional test for the web-based application.

SUMMARY

This Summary is provided to introduce a selection of concepts in a simplified form that are further described below in the Detailed Description. This Summary is not intended to identify key factors or essential features of the claimed subject matter, nor is it intended to be used to limit the scope of the claimed subject matter.

In computing environments, functional testing and user interface (UI) application automation is a process by which functional steps of an application are recreated from previously performed user actions or actions imitated for functional testing or process automation. The purpose of recreating these steps is to recreate all performance of intended actions on a target application without user interaction. In order to accomplish this task, the functional steps of an application need to be recorded, along with all relevant events that may occur as a result of performing the steps in the application. Therefore, to faithfully recreate original user intent when interacting with an application, a recording of the user's action may be performed, followed by performing those actions upon the application using a playback. However, current techniques may not effectively record the user's intent, are typically resource intensive, and may not provide effective functionality.

As provided herein, a technique and system for reliable and efficient recording of functional steps in an application, allow for reliable and efficient playback of the functional steps. The technique and system use instruction (e.g., JavaScript code) injection to apply wrapper functions to event handlers and elements in an application, as necessary, to monitor a state of an event generator before and after actions have be called upon the event generator. In this way, properties of the event generator may be recorded for use by a playback engine, or the properties may be processed to determine a user's intent when performing an action upon the event generator.

For example, if a user clicks on an item on a web page, then intent of that click may not be able to be determined by current techniques. However, the technique and system, provided herein, may be able to determine whether the user intended to select the item, deselect the item, or simply clicked the item for another intent (e.g., to edit or copy the item). To facilitate, at least some of, the same, when a page loads event handler monitoring wrappers are injected into the page and event handlers on the page are associated with the monitoring wrappers. When an event is called upon an element attached to the event handler, the monitoring wrapper function is called to record a state of the element prior to an event handler function being called. Once the event handler function has been called, the monitoring wrapper function is called again to record a state of the element. State sets of the element (e.g., sets of element properties) can be sent to a recording engine, or the state sets can be processed (e.g., compared) to determine user intent.

To the accomplishment of the foregoing and related ends, the following description and annexed drawings set forth certain illustrative aspects and implementations. These are indicative of but a few of the various ways in which one or more aspects may be employed. Other aspects, advantages, and novel features of the disclosure will become apparent from the following detailed description when considered in conjunction with the annexed drawings.

DETAILED DESCRIPTION

The claimed subject matter is now described with reference to the drawings, wherein like reference numerals are used to refer to like elements throughout. In the following description, for purposes of explanation, numerous specific details are set forth in order to provide a thorough understanding of the claimed subject matter. It may be evident, however, that the claimed subject matter may be practiced without these specific details. In other instances, well-known structures and devices are shown in block diagram form in order to facilitate describing the claimed subject matter.

Embodiments described herein relate to techniques for recording actions in application interfaces (e.g., web-based applications, browser applications, user interfaces) by injecting wrapper functions into application instructions, and monitoring a state of an application interface element before and after an event is called upon the element.

In computing environments, to record actions in application interfaces based on external events, for example, the recorder should intercept the event and attempt to locate the element that is the target of the action. The process of looking for the element, in this example, involves inter process communication, which can be quite lengthy. Further, external observation of the event may not be useful for realizing "intent" of the action. As an example, a click on a list item may have "intent" to select, unselect, or change item to an editable state. Capturing "intent" may be possible by using an external application programming interface (API), but this technique often has a significant impact on computing resources (e.g., performance). For example, in the Windows® operating system (OS), there is a default time limit of 500 ms for how long an event can be held before it must be allowed to proceed. While this limit can be changed, changing it may create undesired effects in the OS behavior. Further, this default limit is often hit when attempting to record from an external API provided by a browser.

An alternate technique for recording events from application interfaces involves injecting instructions (e.g., JavaScript code) for event handler wrapper functions into the application interface. When called, the wrapper function collects and processes a set of current state information (e.g., relevant properties) of an event generator (e.g., an element) receiving the event call. The wrapper function then calls an event handler function on the element, then again collects and processes a set of current state information of the event generator. Both sets of information (e.g., properties of the element before the event handler function and properties after) can be sent to a recording engine, or processed (e.g., determining intent of an action by comparing the sets of element states). By employing wrappers around respective event handlers for an event generator (e.g., an element), one can examine information on the state of the event generator (e.g., element properties) before and after an action was taken upon the event generator (e.g., clicking on an element). Further, by using this technique, more than one set of information may be recorded at one time for a given event generator. Therefore, a playback engine may search a list of information sets (e.g., property sets) for the element in order to produce a more accurate playback experience.

Figure 1:
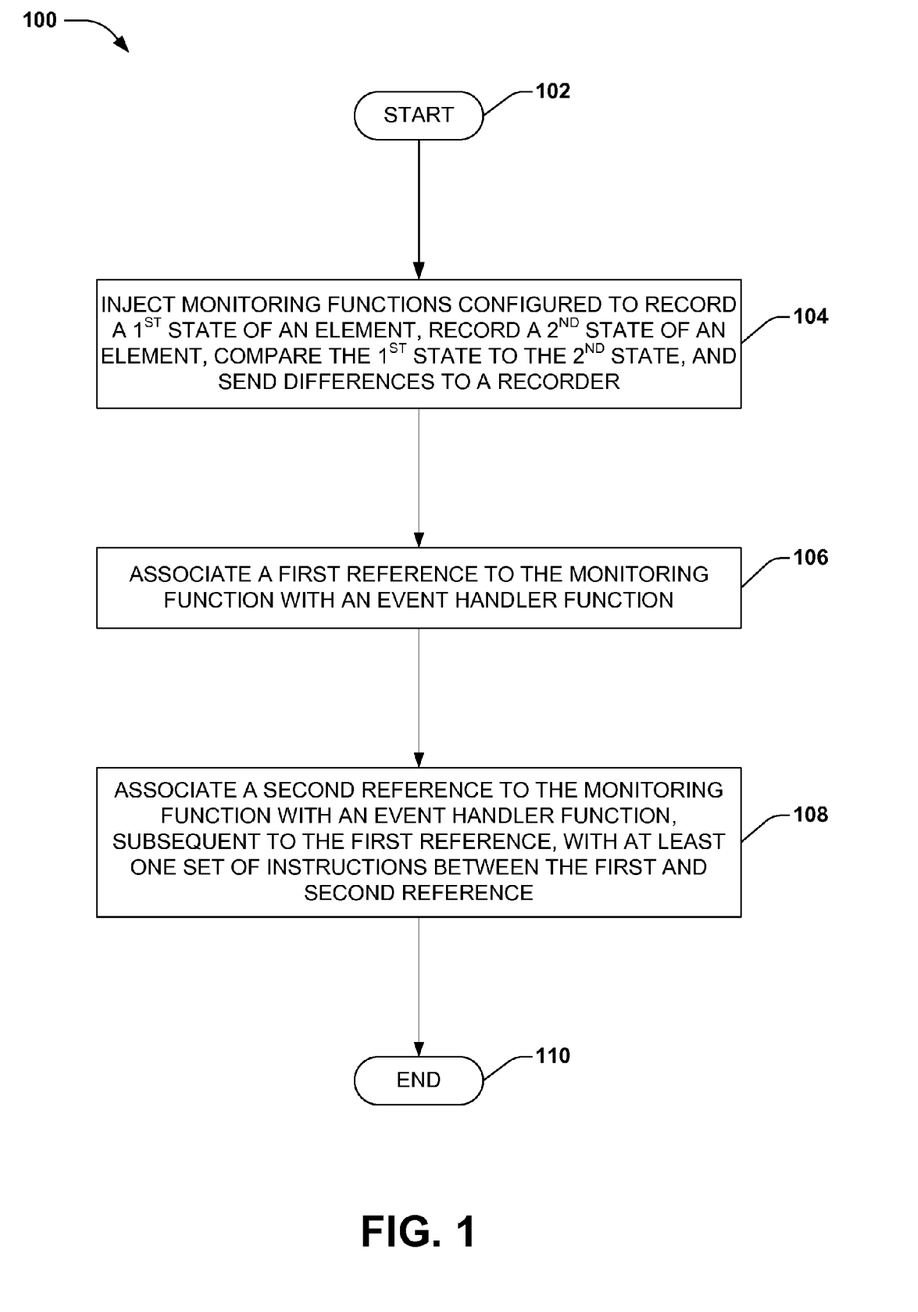
FIG. 1 is a flow diagram illustrating an exemplary method for recording an event set from a user interface by monitoring event handlers.

One embodiment of the technique described above is illustrated by an exemplary method 100 in FIG. 1. Exemplary method 100 begins at 102 and involves injecting instructions, in an application interface, for wrapper monitoring functions at 104; one of which may be configured to record a first state of an event generator (e.g., an element), and one of which may be configured to record a second state of an event generator, compare the first state to the second state, and send event generator properties to a recording engine. At 106, a first reference to a monitoring wrapper function is associated with an event handler. At 108, a second reference to a monitoring wrapper function is associated with the event handler, at a position in the event handler's instructions subsequent to the first reference, with at least one set of instructions between the first reference and the second reference. Having associated the second reference, the method 100 ends at 110.

As an example of this embodiment, one may record actions executed by a user on web page elements having dynamic properties. For example, as a web page is loaded, JavaScript code for one or more monitoring wrapper functions may be injected into the web page code. A first monitoring wrapper may be configured to record a set of properties of a state of an element, prior to an event handler function being called upon the element. A second monitoring wrapper may be configured to record the set of properties of the state of the element after the event handler function is called upon the element, and send both sets of properties of the element to a recording engine. Concurrently, a JavaScript code event handler wrapper, referencing the first and second monitoring wrapper functions, may be inserted in the page code for all event handlers on the page. This event handler wrapper wraps the event handler and includes the event handler function call at a point after a call to the first monitoring wrapper function. For example, the following html code line:

```
<td onclick="appClickHandler"></td>
becomes:
<td onclick= "clickWrapper(appClickHandler)" onkeydown=
"keyDownWrapper( )"...
```

Therefore, when an event handler is called (e.g., when an element is acted upon by an event), prior to the event handler function being called, the first monitoring wrapper is called by the event handler wrapper, which records the state of the element at that time. After the event handler function has proceeded, the second monitoring wrapper is called by the event handler wrapper, which records the state of the element at that time. The second monitoring wrapper then sends the property sets (e.g., before and after execution of the event handler function on the element) to the recording engine. Because the recording engine collects information on element's properties before and after event handler functions have been called upon the elements, a record of events initiated by the user on the web page may be recorded.

In one aspect, there are applications that programmatically attached event handlers (e.g., dynamic event handlers) to elements in response to actions taken in the application, a timer, or other code execution that invokes attachment. Problems may arise when attempting to record actions involving programmatically attached event handlers, such as, an application (e.g., a browser) may not allow for a list of these event handlers to be received (e.g., by a recording system), and these event handlers may be added after a page has loaded or other code has been executed. Therefore, attempting to wrap event handlers, as described above, may not account for programmatically attached event handlers. As such, in order to overcome possible problems additional steps may be included in the technique.

Figure 2:
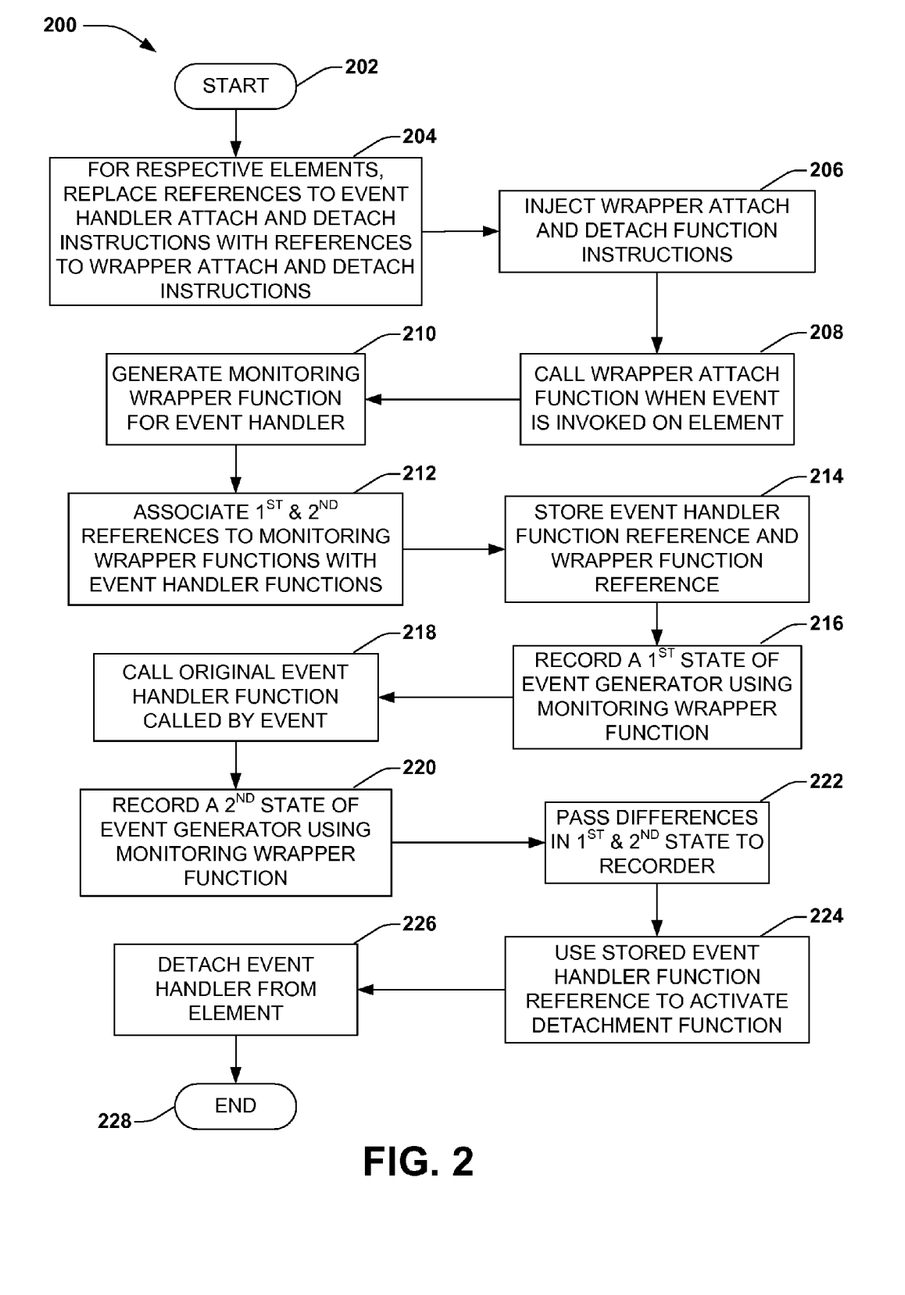
FIG. 2 is a flow diagram illustrating an exemplary method for recording an event set from a user interface with dynamic event handlers.

An embodiment of a technique to overcome problems described above is illustrated in FIG. 2. In FIG. 2 an exemplary method 200 is devised to record events from applications interfaces by monitoring attachment of programmatically attached event handlers and creating wrappers for event handlers. The exemplary method 200 begins at 202 and involves replacing one or more references to event handler attaching and detaching function(s), found in respective elements (e.g., event generator) in an application interface page, with one or more references to one or more wrapper attach and detach functions at 204. Instructions for the one or more wrapper functions for attaching and detaching event handlers are injected into page instructions at 206. At 208, when an event is invoked on an element, the wrapper attach function is called by the wrapper reference in the element. At 210, the wrapper attach function uses an event handler wrapper generator to generate a monitoring wrapper function for an event handler. Once the one or more monitoring wrapper functions are generated, event handler functions are associated with a first reference and second reference (e.g., subsequent to the first) to the monitoring wrapper function at 212. The event handler function reference and the monitoring wrapper function reference are stored at 214. When an event is invoked on the element, the monitoring wrapper function records a first state of the element, prior to the event handler function being called at 216. The event handler function is called at 218, and second state of the element is recorded by the monitoring wrapper function at 220. The property sets of the first state and second state are passed to a recording engine at 222. Once the information is recorded, the stored references are used to activate the event handler detach function for an element at 224, where a wrapper detach function finds the stored event handler function reference. Detachment of the event handler occurs at 226. Having completed the event handler detachment, the exemplary method 200 ends at 228.

It is to be appreciated that there is not necessarily an attach/detach handler per every event invocation. Rather, event handlers are attached and detached as necessary, generally at the beginning of page loading and/or upon completion of certain conditions. To effectively detect such programmatically added handlers, references to one or more wrapper attach and detach functions are substituted for references to event handler attaching and detaching function very early on. Should an event handler be attached, arriving events can be readily diverted since the attach method itself is "hijacked", and so had a chance to make the aforementioned wrapper for handler substitution. Essentially, attach and detach methods for respective elements are substituted or "hijacked" (as early as possible), an application decides whether to attach or detach event handlers (e.g., whenever the application wants to monitor events, where timing of such monitoring is generally unknown), and events then arrive at the wrapper if an event handler was attached.

Figure 3:
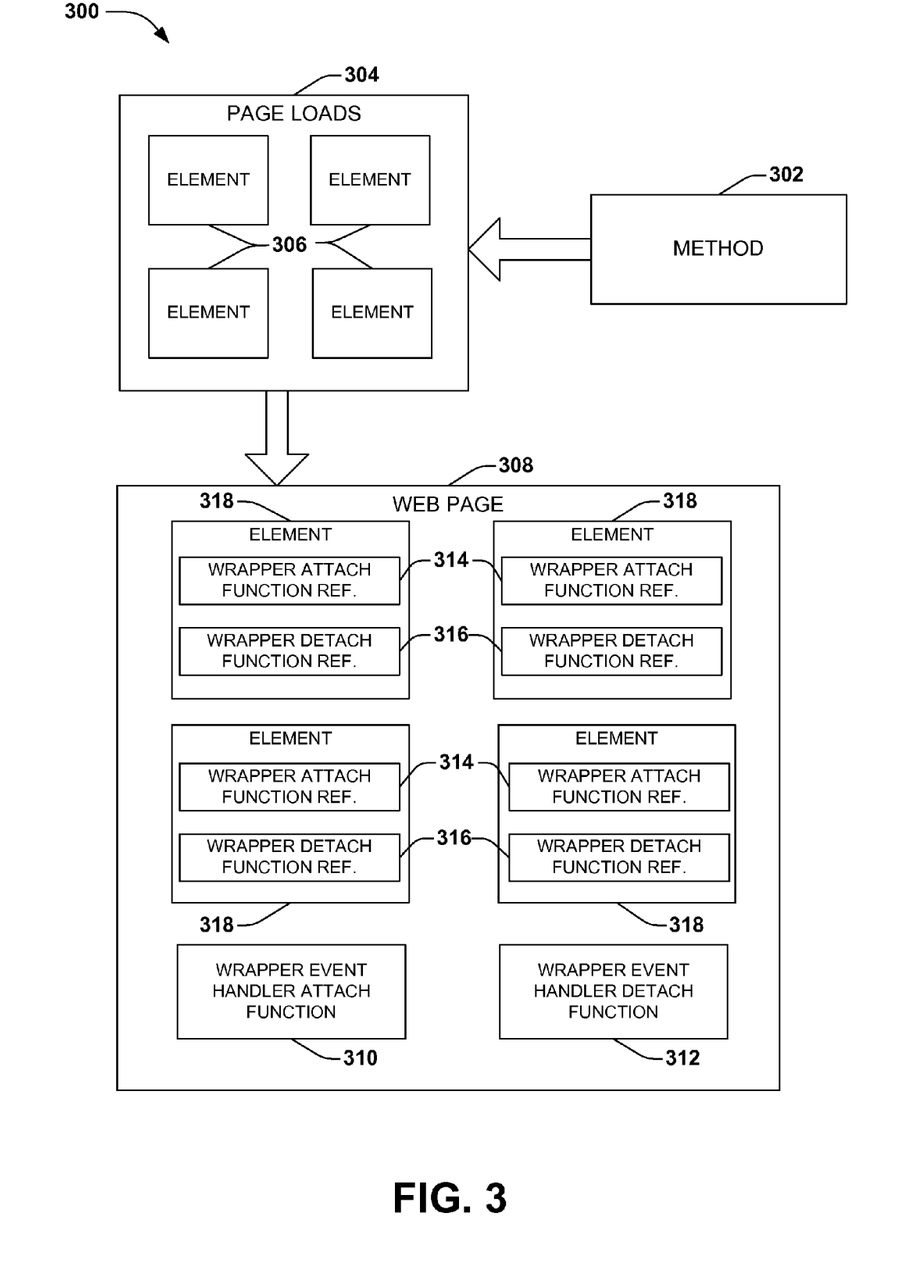
FIG. 3 is an illustration of a portion of an exemplary embodiment of a method for recording an event set from a user interface.
Figure 4:
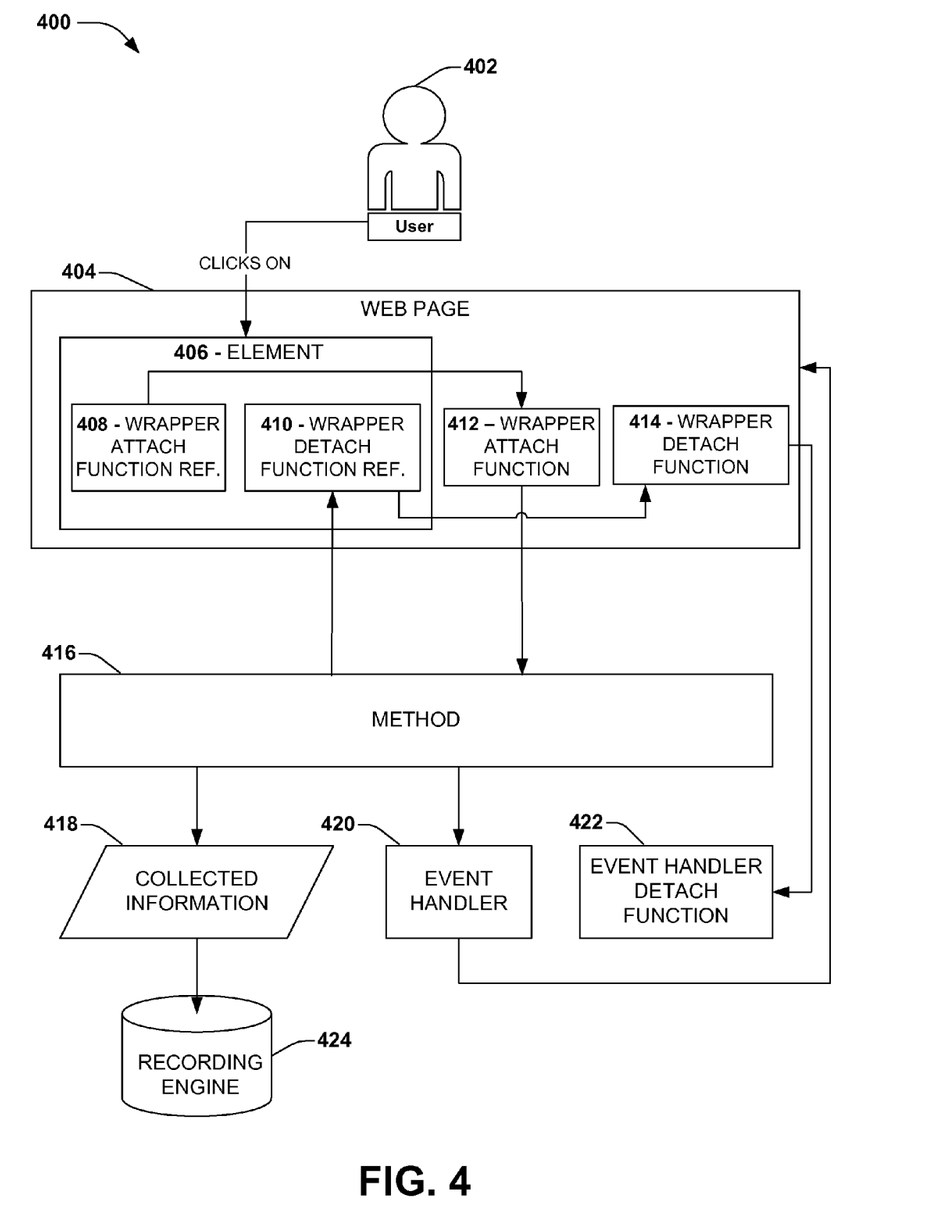
FIG. 4 is an illustration of a portion of an exemplary embodiment of a method for recording an event set from a user interface.

As an example, one embodiment of the exemplary method 200 in FIG. 2 is illustrated in FIGS. 3 and 4. In FIG. 3, the method 302 acts upon an exemplary web page 304 as the page loads all its elements 306. When the web page finishes loading 308 a wrapper attach function 310 and a wrapper detach function 312 have been injected into the web page code. Further, references to the wrapper attach function 314 and the wrapper detach function 316 have been inserted in each of the elements 318 on the loaded web page 308, in place of references that pointed to the original registration and deregistration functions for each element 318.

In FIG. 4 a user 402 acts upon an element 406 in a web page 404 (e.g., by clicking on the element), which calls for dynamically attaching an event handler 420. A wrapper attach function reference 408 in the element 406 calls to a wrapper attach function 412 in the web page's code, which initiates a method 416. The method 416 collects a set of properties of the element 406 in the web page 404 prior to the event handler 420 acting upon the element 406. Further, the method 416 initiates the dynamically attached event handler 420 that is called when the user 402 clicked on the element 406 in the web page 404. The event handler 420 acts upon the web page 404, as it would have without the method 416. When the event handler 420 has completed its function on the web page 404, the method 416 again collects a set of properties of the element 406 in the web page 404. The collected sets of properties of the element 406 are sent to a recording engine 424. The method 416 calls back to the wrapper detach function reference 410 in the element 406, which calls to the wrapper detach function 414 in the web page 404. The wrapper detach function 414 activates the event handler detach function 422, dynamically detaching the event handler 420 from the element 406.

In another aspect, some elements in an application interface may be created dynamically, for example, by invoking document object model (DOM) methods to create and add elements to a browser page. In this example, creation of an element is a DOM method, whereas adding created elements is either a method of the page or a method of an element to which elements are added as children. Both the addition of an element as a method of a page and the addition of an element as a method of an element to which elements are added as children can be "wrapped" by having a wrapper function perform all actions performed on preexisting elements in an application interface. In this aspect, instructions for wrappers are injected around event handlers that are placed as attributes on created elements. Further, as described above, event handler attach and detach wrapper functions are injected for respective newly created and/or newly attached elements. Also, attach element wrapper function instructions are injected around an attach element method of respective elements, such that children added to the element may also be wrapped, as described above.

Therefore, as an example, a user's action on a web browser page may call a DOM method "createElement" and add a newly created element to the web page. In this example, as described in method 200 above, wrapper attach and detach event handler functions are injected into the page code for the newly created and added element, and event handlers attached to the newly added element are wrapped with wrapper monitoring functions. Further, an attach element function for the newly added element is wrapped with a wrapper function that creates wrappers for any newly added children of the element. As in method 200, the newly added element from the user's action on the web page may be monitored during respective actions upon the element, and its properties may be sent to a recording engine. In this example, when a tester wishes to perform functional testing of the user's action upon the web page, an automated playback of the user's actions will include creating and adding an element to the web page, and any other actions that the user may have performed upon the newly added element.

In yet another aspect, a mouse over is an action of passing a mouse cursor over an element. Some application interfaces (e.g., dynamic web pages) may use this action to activate additional functionality (e.g., activating menus not previously visible when a mouse cursor passes over an element on a browser page). Because a mouse over is not visible as an event outside of the DOM, a problem may arise when attempting to record a mouse hover. At levels outside of the DOM the only action indicating a mouse over is an act of moving a mouse. Currently, there may be several solutions for recording a mouse over event. One solution may be to record all mouse movements; however, system performance is negatively affected and playback failure invariably occurs in some situations. Another solution may be to record all mouse moves in correlation with underlying elements; however, while failure during playback is less likely, system resources are taxed even more than the previous solution. Yet another solution may be to perform a lookup of an element's bounding rectangle each time there is a given mouse position change, and ignore further movements if they occur within the rectangle; however, while system performance is better than the previous solutions, one must still record many mouse movements, which is more likely to lead to playback failure and decreased system performance.

In this aspect, an alternate technique for recording mouse over events in an application interface is to use the methods, described herein, for injecting wrapper functions, wrapping event handlers and monitoring an element's properties. Further, this method can account for elements that do not activate an event when a mouse over occurs, by ignoring such actions. As an example, during wrapping of registered event handlers, if an element does not have an attached event handler for a mouse event, this element can be ignored during recording. However, if the element does have an attached event handler for mouse motion events, the wrapping method, described herein, can monitor and record the event as a mouse over event on the element, as described above. Further, if the mouse over action results in a change to the element's layout, its properties are recorded using the method herein. As an example, when wrapping event handlers for mouse over events injected wrapper functions (e.g., programming code instructions) may be executed before an action is taken by an element for an event, and after all actions are executed by the element. In this example, a wrapper function (e.g., a mouseenter wrapper) is injected at the element level as an event is first detected at this level, then injecting a wrapper function (e.g., a mouseexit wrapper) at the document level. In this example, the mouse movements and actions that occur as a result of a mouse over can be recorded.

In yet another aspect, element selection/deselection may be an action, for example, upon an element in a list, table, or on an application page. A problem with state of the art solutions for recording such an event is that intent of a click upon an element cannot be determined. For example, clicking on an element may be an action selecting the item, deselecting the item, or no action other than a click. Therefore, proper functional playback of such a recorded event may be affected. However, in this aspect, one may use the method for injecting wrapper functions, wrapping event handlers and monitoring an element's properties, described herein, to record element selection/deselection events in an application interface.

In this aspect, as an example, by wrapping all event handlers by injecting instructions (e.g., JavaScript code), including selection handlers (e.g., onchange event) and mouse event handlers (e.g., onclick event), effective recording of element selection/deselection events may occur. As a result, a "click" on an element may be intercepted before propagating it to the element. Further, the element's properties may be checked to determine whether it supports "selection." After the "click" event proceeds, properties of the element are again recorded, capturing the intent of the "click" action. Once properties of the element prior to the "click" and after the "click" are captured, the intent of the "click" can be determined and recorded.

Figure 5:
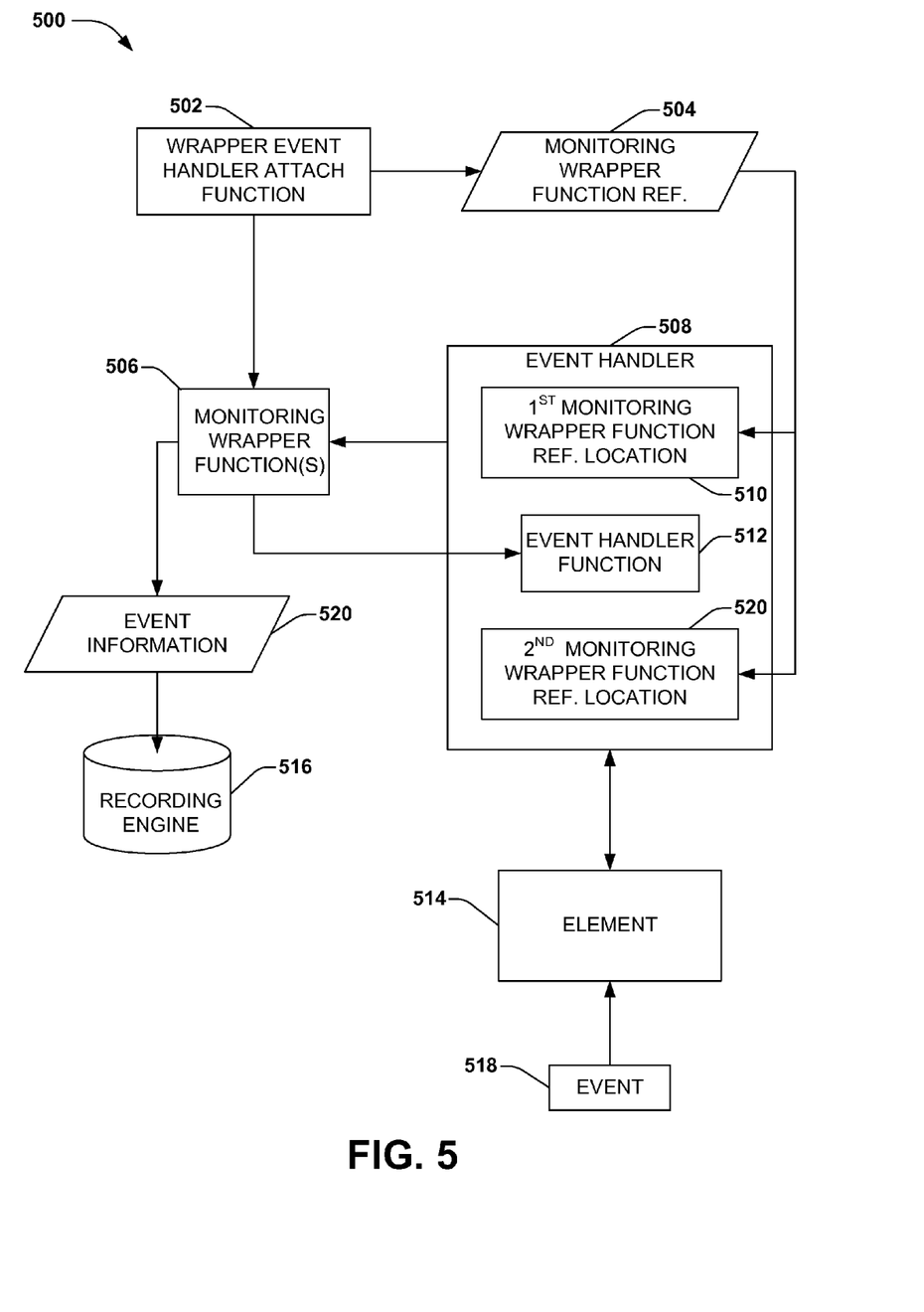
FIG. 5 is a block diagram illustration of exemplary system for recording an event set from a user interface by monitoring event handlers.

A system may be configured to record events from web-based applications or user interfaces by registering event handlers with references to wrappers and creating wrappers for event handlers, such as illustrated by an exemplary system 500 in FIG. 5. The exemplary system 500 has an event handler registerer 502 that injects an event handler wrapper function 506 and replaces an event handler function reference 510 in an event handler 508 with a wrapper function reference 504. When an event 518 is invoked upon an element 514, the element calls to the registered event handler 508, which calls to the wrapper function 506 via the wrapper function reference 504 now in place in the event handler 508. The wrapper function 506 collects and sends information 520 associated with the event to the recording engine 516. After the information 520 is collected and sent, the wrapper function 506 calls to the original event handler function 512, which performs its functions upon the element 514.

Figure 6:
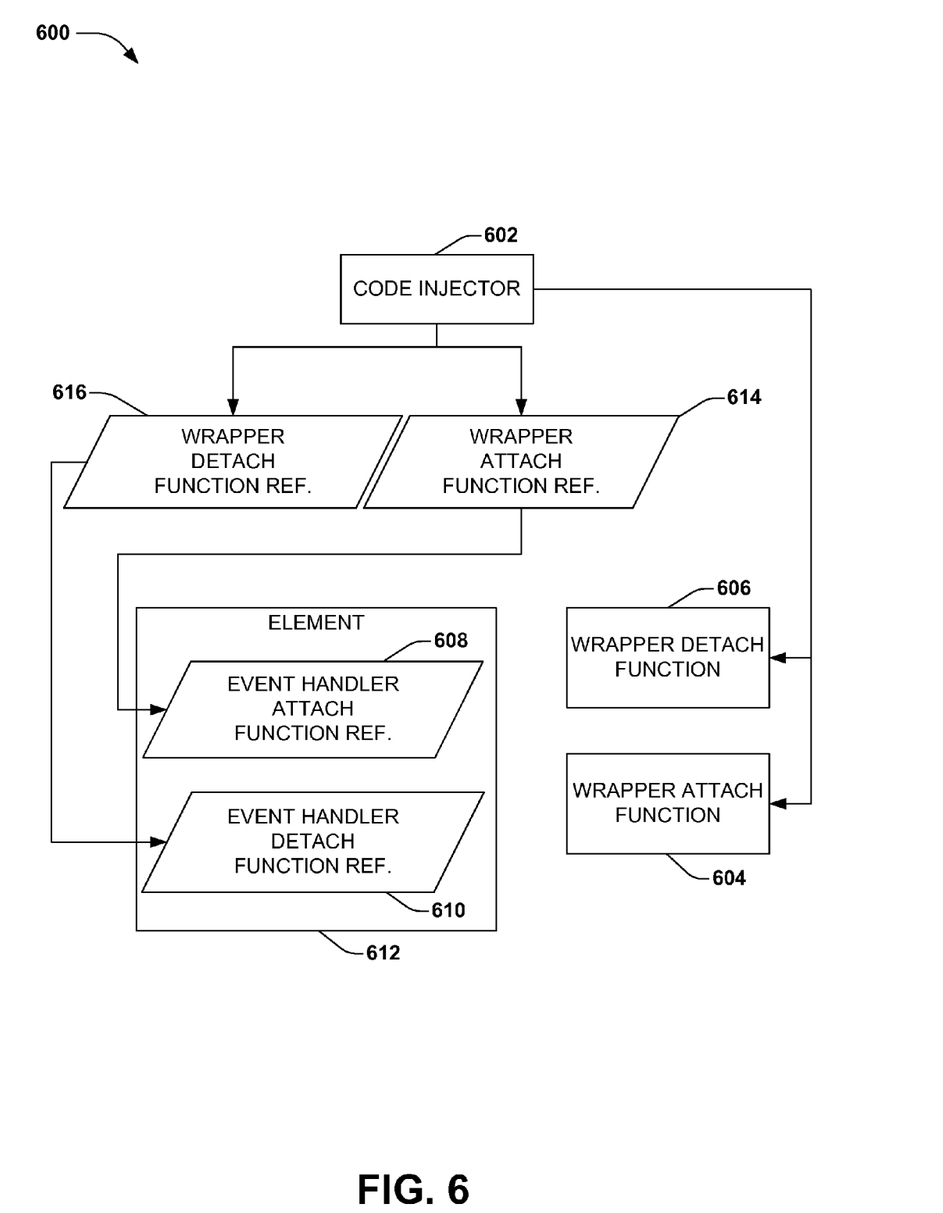
FIG. 6 is a block diagram illustration of a portion of an exemplary system for recording an event set from a user interface with dynamic event handlers.
Figure 7:
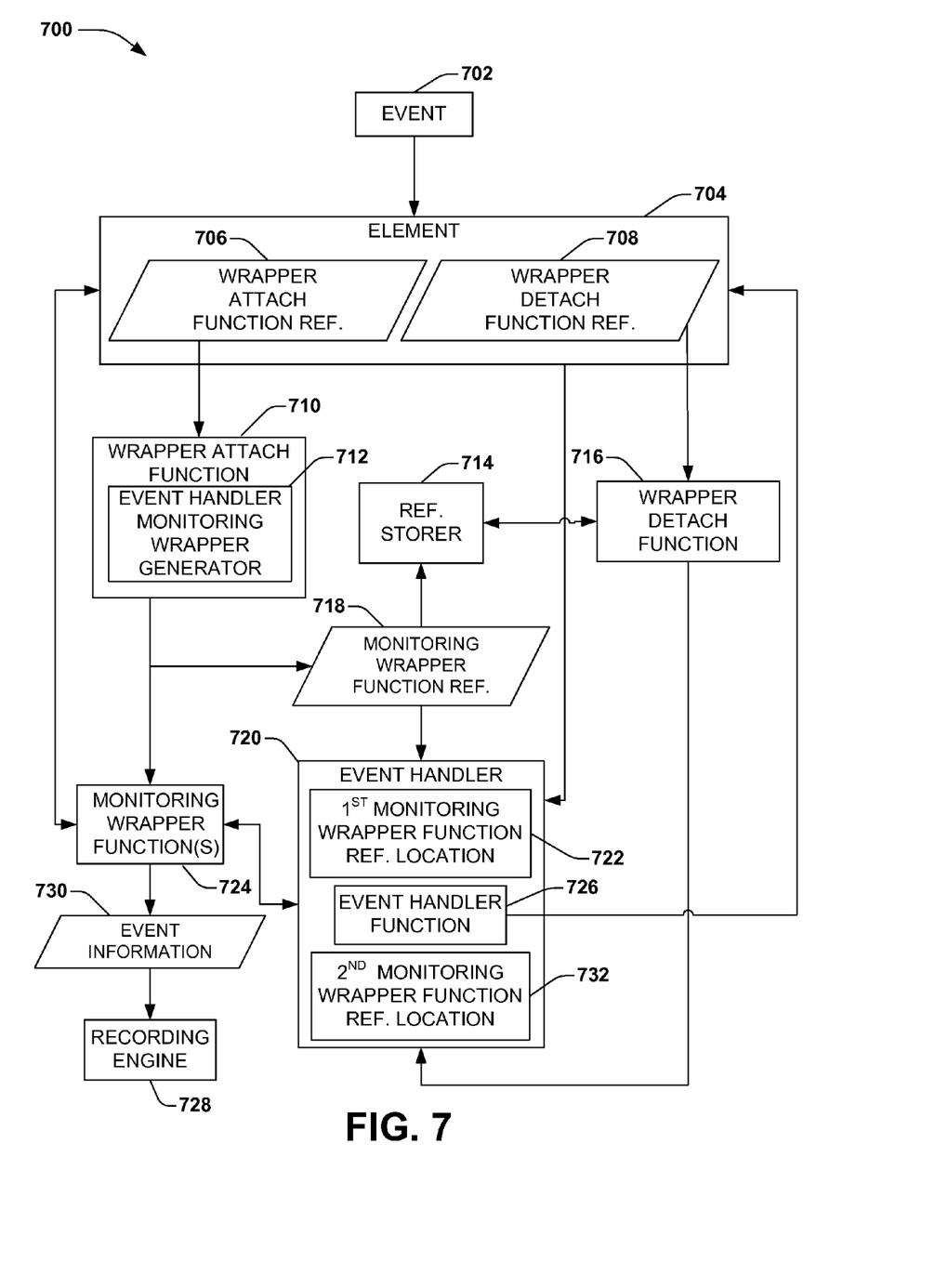
FIG. 7 is a block diagram illustration of a portion of an exemplary system for recording an event set from a user interface with dynamic event handlers.

FIGS. 6 and 7 illustrate one embodiment of exemplary systems 600 and 700 for recording events from web-based applications or user interfaces by monitoring registration of event handlers and creating wrappers for event handlers. As illustrated in FIG. 6, a code injector 602 creates a wrapper attach event handler function for 604 and a wrapper detach event handler function 606. The code injector 602 also replaces an event handler attach function reference 608 and an event handler detach function reference 610 in an element (e.g., event generator) 612, with a reference to a wrapper attach function 614 and a reference to a wrapper detach function 616.

In FIG. 7 when an event 702 is invoked on an element 704 the reference to the wrapper attach function 706 calls to the wrapper attach function 710. An event handler monitoring wrapper function generator 712 creates and injects an event handler monitoring wrapper function 724, injects a reference to an event handler monitoring wrapper function 718 in an event handler 720 at a $1^{st}$ location 722 and at a $2^{nd}$ location 732, and sends both the reference to an event handler monitoring wrapper function 718 and the reference to the event handler function 726 to a reference storer 714. The event handler monitoring wrapper function 724 records a $1^{st}$ state of the element 704, prior to an event handler function being called upon it. The event handler monitoring wrapper function 724 calls to the event handler 720 to invoke the event function 726 upon the element 704. A $2^{nd}$ monitoring wrapper function reference 724 calls to the monitoring wrapper function 724, which records a $2^{nd}$ state of the element 704. The monitoring wrapper function 724 sends a $1^{st}$ and $2^{nd}$ state of the element 704 as event information 730 to a recording engine 728. The event handler function 726 calls back to the element 704 for deregistration of the event handler 720. The reference to a wrapper detach function 708 calls to a wrapper detach function 716, which calls to the reference storer 714 to retrieve the reference to event handler function 726 stored there. The wrapper detach function 716 calls to the event handler 720 to deregister from the element 704.

Figure 8:
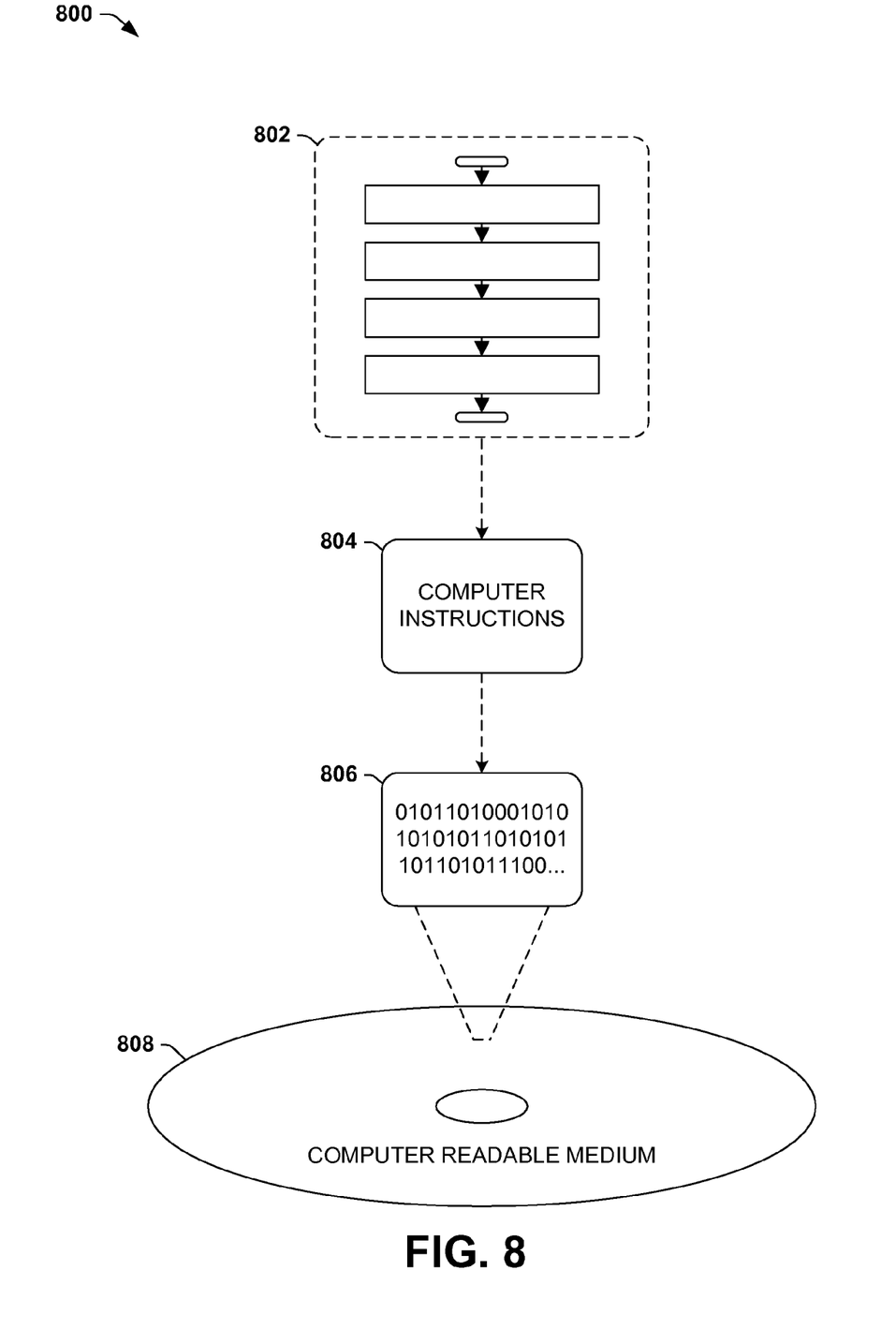
FIG. 8 is an illustration of an exemplary computer-readable medium comprising processor-executable instructions configured to embody one or more of the techniques provided herein.

Another embodiment (which may include one or more of the variations described above) involves a computer-readable medium comprising processor-executable instructions configured to apply one or more of the techniques presented herein. An exemplary computer-readable medium that may be devised in these ways is illustrated in FIG. 8, wherein the implementation 800 comprises a computer-readable medium 808 (e.g., a CD-R, DVD-R, or a platter of a hard disk drive), on which is encoded computer-readable data 806. This computer-readable data 806 in turn comprises a set of computer instructions 804 configured to operate according to the principles set forth herein. In one such embodiment, the processor-executable instructions 804 may be configured to perform a method 802 for recording events from user interfaces by registering event handlers with references to wrappers and creating wrappers for event handlers, such as the method 100 of FIG. 1, for example. Many such computer-readable media may be devised by those of ordinary skill in the art that are configured to operate in accordance with the techniques presented herein.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

As used in this application, the terms "component," "module," "system", "interface", and the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. Of course, those skilled in the art will recognize many modifications may be made to this configuration without departing from the scope or spirit of the claimed subject matter.

Figure 9:
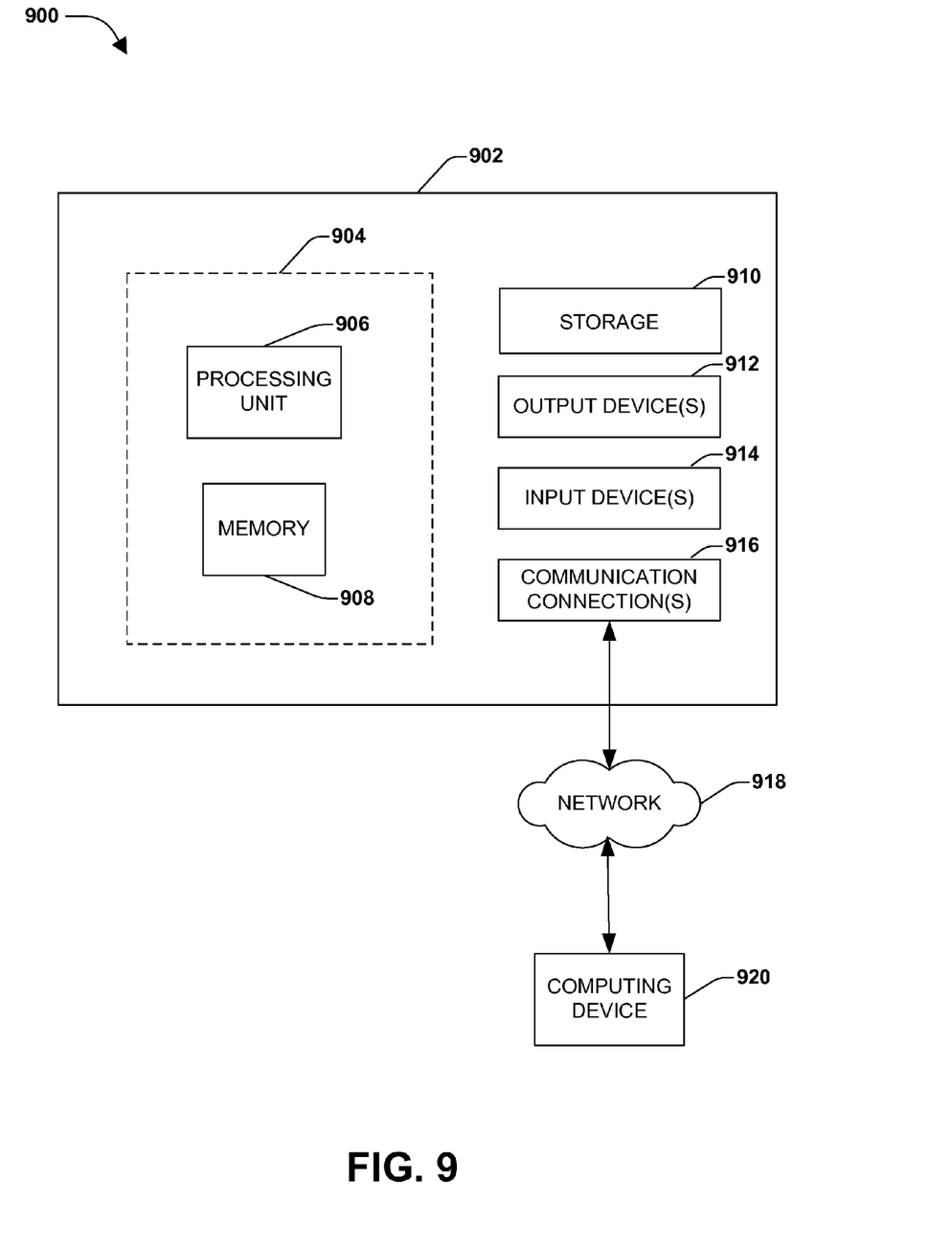
FIG. 9 illustrates an exemplary computing environment wherein one or more of the provisions set forth herein may be implemented.

FIG. 9 and the following discussion provide a brief, general description of a suitable computing environment to implement embodiments of one or more of the provisions set forth herein. The operating environment of FIG. 9 is only one example of a suitable operating environment and is not intended to suggest any limitation as to the scope of use or functionality of the operating environment. Example computing devices include, but are not limited to, personal computers, server computers, hand-held or laptop devices, mobile devices (such as mobile phones, Personal Digital Assistants (PDAs), media players, and the like), multiprocessor systems, consumer electronics, mini computers, mainframe computers, distributed computing environments that include any of the above systems or devices, and the like.

Although not required, embodiments are described in the general context of "computer readable instructions" being executed by one or more computing devices. Computer readable instructions may be distributed via computer readable media (discussed below). Computer readable instructions may be implemented as program modules, such as functions, objects, Application Programming Interfaces (APIs), data structures, and the like, that perform particular tasks or implement particular abstract data types. Typically, the functionality of the computer readable instructions may be combined or distributed as desired in various environments.

FIG. 9 illustrates an example of a system 910 comprising a computing device 912 configured to implement one or more embodiments provided herein. In one configuration, computing device 912 includes at least one processing unit 916 and memory 918. Depending on the exact configuration and type of computing device, memory 918 may be volatile (such as RAM, for example), non-volatile (such as ROM, flash memory, etc., for example) or some combination of the two. This configuration is illustrated in FIG. 9 by dashed line 914.

In other embodiments, device 912 may include additional features and/or functionality. For example, device 912 may also include additional storage (e.g., removable and/or non-removable) including, but not limited to, magnetic storage, optical storage, and the like. Such additional storage is illustrated in FIG. 9 by storage 920. In one embodiment, computer readable instructions to implement one or more embodiments provided herein may be in storage 920. Storage 920 may also store other computer readable instructions to implement an operating system, an application program, and the like. Computer readable instructions may be loaded in memory 918 for execution by processing unit 916, for example.

The term "computer readable media" as used herein includes computer storage media. Computer storage media includes volatile and nonvolatile, removable and non-removable media implemented in any method or technology for storage of information such as computer readable instructions or other data. Memory 918 and storage 920 are examples of computer storage media. Computer storage media includes, but is not limited to, RAM, ROM, EEPROM, flash memory or other memory technology, CD-ROM, Digital Versatile Disks (DVDs) or other optical storage, magnetic cassettes, magnetic tape, magnetic disk storage or other magnetic storage devices, or any other medium which can be used to store the desired information and which can be accessed by device 912. Any such computer storage media may be part of device 912.

Device 912 may also include communication connection(s) 926 that allows device 912 to communicate with other devices. Communication connection(s) 926 may include, but is not limited to, a modem, a Network Interface Card (NIC), an integrated network interface, a radio frequency transmitter/receiver, an infrared port, a USB connection, or other interfaces for connecting computing device 912 to other computing devices. Communication connection(s) 926 may include a wired connection or a wireless connection. Communication connection(s) 926 may transmit and/or receive communication media.

The term "computer readable media" may include communication media. Communication media typically embodies computer readable instructions or other data in a "modulated data signal" such as a carrier wave or other transport mechanism and includes any information delivery media. The term "modulated data signal" may include a signal that has one or more of its characteristics set or changed in such a manner as to encode information in the signal.

Device 912 may include input device(s) 924 such as keyboard, mouse, pen, voice input device, touch input device, infrared cameras, video input devices, and/or any other input device. Output device(s) 922 such as one or more displays, speakers, printers, and/or any other output device may also be included in device 912. Input device(s) 924 and output device(s) 922 may be connected to device 912 via a wired connection, wireless connection, or any combination thereof. In one embodiment, an input device or an output device from another computing device may be used as input device(s) 924 or output device(s) 922 for computing device 912.

Components of computing device 912 may be connected by various interconnects, such as a bus. Such interconnects may include a Peripheral Component Interconnect (PCI), such as PCI Express, a Universal Serial Bus (USB), firewire (IEEE 8394), an optical bus structure, and the like. In another embodiment, components of computing device 912 may be interconnected by a network. For example, memory 918 may be comprised of multiple physical memory units located in different physical locations interconnected by a network.

Those skilled in the art will realize that storage devices utilized to store computer readable instructions may be distributed across a network. For example, a computing device 930 accessible via network 928 may store computer readable instructions to implement one or more embodiments provided herein. Computing device 912 may access computing device 930 and download a part or all of the computer readable instructions for execution. Alternatively, computing device 912 may download pieces of the computer readable instructions, as needed, or some instructions may be executed at computing device 912 and some at computing device 930.

Various operations of embodiments are provided herein. In one embodiment, one or more of the operations described may constitute computer readable instructions stored on one or more computer readable media, which if executed by a computing device, will cause the computing device to perform the operations described. The order in which some or all of the operations are described should not be construed as to imply that these operations are necessarily order dependent. Alternative ordering will be appreciated by one skilled in the art having the benefit of this description. Further, it will be understood that not all operations are necessarily present in each embodiment provided herein.

Moreover, the word "exemplary" is used herein to mean serving as an example, instance, or illustration. Any aspect or design described herein as "exemplary" is not necessarily to be construed as advantageous over other aspects or designs. Rather, use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims may generally be construed to mean "one or more" unless specified otherwise or clear from context to be directed to a singular form.

Also, although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure which performs the function in the herein illustrated exemplary implementations of the disclosure. In addition, while a particular feature of the disclosure may have been disclosed with respect to only one of several implementations, such feature may be combined with one or more other features of the other implementations as may be desired and advantageous for any given or particular application. Furthermore, to the extent that the terms "includes", "having", "has", "with", or variants thereof are used in either the detailed description or the claims, such terms are intended to be inclusive in a manner similar to the term "comprising."

What is claimed is:

1. A method for recording one or more states related to a user interface, comprising:
    injecting one or more monitoring wrapper functions into the user interface, at least some of the monitoring wrapper functions comprising:
        a first monitoring wrapper function configured to record a first state of an event generator; and
        a second monitoring wrapper function configured to record a second state of the event generator based at least in part on an intent of an action, the second state indicative of the intent of the action;
    associating a first reference to at least some of the monitoring wrapper functions with an event handler;
    associating a second reference to at least some of the monitoring wrapper functions, subsequent to the first reference, with the event handler, the second reference comprising one or more sets of instructions between the first reference and the second reference in the event handler; and
    using at least some of the monitoring wrapper functions to collect information from an event invoked by the event generator, comprising:
        recording the first state of the event generator prior to invocation of the event;
        calling one or more event handler functions called by the event;
        recording the second state of the event generator after completion of the event; and
        passing the collected information to a recording engine.

2. The method of claim 1, at least some of the monitoring wrapper functions implemented in JAVASCRIPT.

3. The method of claim 1, comprising:
    replacing instructions that attach and detach the event handler with instructions that attach and detach wrappers for the event handler;
    upon invocation of the event, generating at least some of the monitoring wrapper functions for the event handler; and
    storing references to at least some event handler functions and references to the monitoring wrapper functions.

4. The method of claim 3, comprising calling a deregistration function using at least some of the stored references.

5. The method of claim 3, replacing instructions comprising:
    injecting wrapper instructions for attaching and detaching the event handler; and
    replacing references to instructions that attach and detach the event handler with references that attach and detach wrappers for the event handler.

6. The method of claim 3, replacing instructions comprising at least one of:
    replacing instructions concurrent with an application interface load; and
    replacing instructions after the application interface load.

7. The method of claim 1, the event generator comprising an element configured to attach the event handler dynamically.

8. The method of claim 1, the second monitoring wrapper function configured to determine the intent of the action based at least in part on a comparison between the first state and the second state.

9. The method of claim 1, passing the collected information to a recording engine comprising:
    injecting one or more new elements into the user interface; and
    sending newly collected information from at least some of the new elements to the recording engine.

10. The method of claim 9, at least some of the new elements comprising:
    one or more lists of one or more events; and
    one or more corresponding properties collected from at least some of the events.

11. The method of claim 1, passing the collected information to a recording engine comprising:
    injecting one or more broker objects into the user interface;
    sending the collected information to at least some of the broker objects; and
    sending the collected information from at least some of the broker objects to the recording engine.

12. The method of claim 1, the first monitoring wrapper function and the second monitoring wrapper function comprising a common monitoring wrapper function.

13. The method of claim 1, the user interface is comprised within a web page.

14. The method of claim 1, the intent comprising user intent.

15. The method of claim 1, at least some of the states comprising one or more sets of properties for an element.

16. The method of claim 1, at least one of associating the first reference and associating the second reference comprising replacing a reference to an event handler function with a reference to at least one of the monitoring wrapper functions.

17. A system for recording one or more states related to a user interface, comprising:
   an instruction injector configured to inject one or more monitoring wrapper function instructions into the user interface, at least some of the monitoring wrapper function instructions comprising:
      a first monitoring wrapper function configured to record a first state of an event generator; and
      a second monitoring wrapper function configured to record a second state of the event generator based at least in part on an intent of an action, the second state indicative of the intent of the action;
   an event handler monitoring wrapper generator configured to:
      associate a first reference to at least some of the monitoring wrapper functions with an event handler;
      associate a second reference to at least some of the monitoring wrapper functions, subsequent to the first reference, with the event handler, the second reference comprising one or more sets of instructions between the first reference and the second reference in the event handler; and
      use at least some of the monitoring wrapper functions to collect information from an event invoked by the event generator, comprising:
         recording the first state of the event generator prior to invocation of the event:
         calling one or more event handler functions called by the event;
         recording the second state of the event generator after completion of the event: and
         passing the collected information to a recording engine; and
   a processing unit configured to implement at least some of at least one of the instruction injector and the event handler monitoring wrapper generator.

18. The system of claim 17, comprising:
   a wrapper generator configured to generate at least some of the monitoring wrapper functions.

19. The system of claim 17, at least one of:
   the user interface is comprised within a web page; and
   the intent comprising user intent.

20. A computer readable storage medium comprising instruction that when executed at least in part via a processing unit perform a method for recording one or more states related to a user interface, comprising:
   injecting one or more monitoring wrapper functions into the user interface, at least some of the monitoring wrapper functions comprising:
      a first monitoring wrapper function configured to record a first state of an event generator; and
      a second monitoring wrapper function configured to record a second state of the event generator based at least in part on an intent of an action, the second state indicative of the intent of the action;
   associating a first reference to at least some of the monitoring wrapper functions with an event handler;
   associating a second reference to at least some of the monitoring wrapper functions, subsequent to the first reference, with the event handler, the second reference comprising at least one set of instructions between the first reference and the second reference in the event handler; and
   using at least some of the monitoring wrapper functions to collect information from an event invoked by the event generator, comprising:
      recording the first state of the event generator prior to invocation of the event;
      calling one or more event handler functions called by the event;
      recording the second state of the event generator after completion of the event; and
      passing the collected information to a recording engine.

* * * * *